United States Patent [19]
DeCarlo, Jr.

[11] Patent Number: 5,894,429
[45] Date of Patent: Apr. 13, 1999

[54] METHOD FOR CREATING A DIGITAL CONTROL SIGNAL

[75] Inventor: Robert D. DeCarlo, Jr., Palatine, Ill.

[73] Assignee: Zenith Electronics Corporation, Glenview, Ill.

[21] Appl. No.: 08/905,884

[22] Filed: Aug. 1, 1997

[51] Int. Cl.[6] .................................................. G06F 17/10
[52] U.S. Cl. .................................. 364/724.19; 375/350
[58] Field of Search .................... 364/724.19, 724.011; 375/350

[56] References Cited

U.S. PATENT DOCUMENTS

| | | |
|---|---|---|
| 4,910,799 | 3/1990 | Takayama ................................ 375/350 |
| 5,257,292 | 10/1993 | Sauvagerd et al. ..................... 375/350 |
| 5,278,910 | 1/1994 | Suzuki et al. ...................... 364/724.011 |
| 5,428,563 | 6/1995 | Takenaka ......................... 364/724.011 |

*Primary Examiner*—David H. Malzahn

[57] ABSTRACT

A method and system for converting an input signal into a dynamically-controlled digital output signal. A sensitivity and a threshold level of a digital input signal is adjusted. An absolute value or a constant polarity of the adjusted digital input signal is compared to a previous output signal and at least one state variable is modified to achieve a desired attack time of the filter. The adjusted digital signal is either then passed through or bypassed around the filter to produce the dynanically-controlled digital output signal.

36 Claims, 2 Drawing Sheets

METHOD FOR CREATING A DIGITAL CONTROL SIGNAL

BACKGROUND OF THE INVENTION

1. Field of the Invention

This invention is for a method and system related to a dynamically-controlled multiplier capable of converting a digital input signal into a modified, dynamically-controlled digital output signal.

2. Description of Prior Art

In conventional Pulse-Code Modulation (PCM) technology, a signal is periodically sampled then quantized into a discrete number of levels, such as voltage levels, and subsequently coded as a sequence of digits. For a general explanation of PCM, see Bernard Sklar, *Digital Communications Fundamentals and Applications*, p. 73 (1988 Prentice-Hall, Inc.). Depending upon resolution of quantization, or number of binary bits per sample, and the sampling rate selected, the PCM representation can closely approximate an original continuous or analog signal. For example, electronic compact disc players typically employ a PCM signal. The term "voltage" can relate to a sequence of PCM samples.

SUMMARY OF THE INVENTION

It is one object of this invention to provide a method and system for converting an input signal, such as a digital input signal, to a dynamically-controlled output signal.

The above and other objects of this invention are accomplished with a method and system that over time modifies one or more state variables of a filter, to control the attack and/or the decay characteristics. An input signal, such as a digital input signal from an audio or any other suitable input source, is adjusted to produce a constant-polarity signal with a particular sensitivity to a saturation level.

The state variables of the filter are initially set at predetermined values. The constant-polarity signal is compared to a previous output signal. Depending upon the analysis of the comparison, the state variables can be modified or can remain unchanged. The constant-polarity signal can then be passed through the filter. It is also possible for the constant-polarity signal to bypass the filter.

A present output signal emitted from or bypassed around the filter can then be multiplied by a digital signal to produce a dynamically-controlled signal. The dynamically-controlled signal can be used in any suitable electronic system, such as a sound system or a modem.

BRIEF DESCRIPTION OF THE DRAWINGS

The method and system according to this invention is described in further detail and can be further understood when read in view of the drawings, wherein.

DESCRIPTION OF PREFERRED EMBODIMENTS

Figure 1:
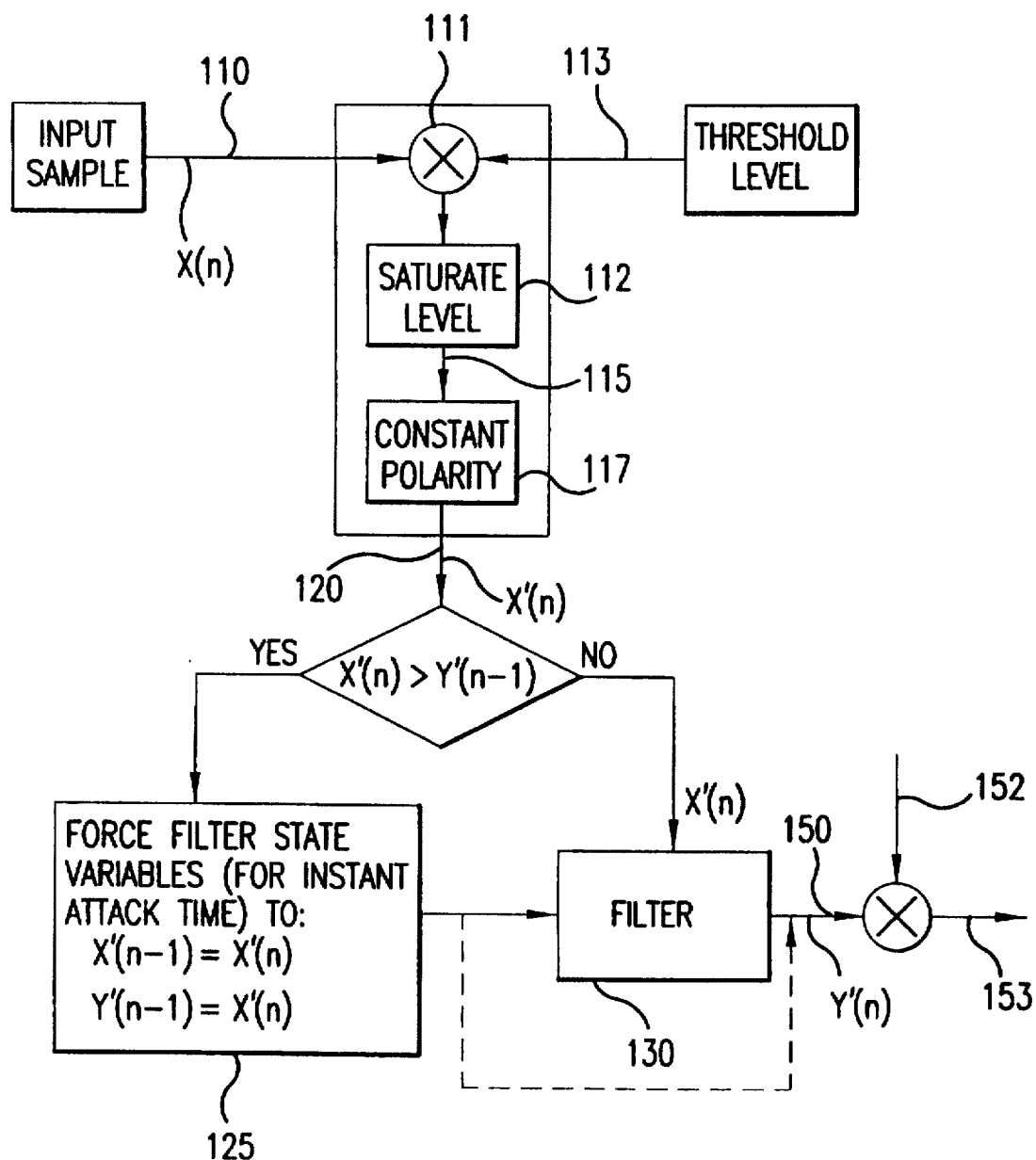
FIG. 1 is a flowchart showing a method and system for converting a digital control signal, according to one preferred embodiment of this invention.

As shown in FIG. 1, the method according to one preferred embodiment of this invention preferably begins with adjusting a sensitivity and a saturation point or level of a control voltage of input signal 110, such as by multiplying input signal 110 by signal 113 which has a particular threshold level. A magnitude of input signal 110 is preferably but not necessarily less than one or unity. The threshold level of signal 113 preferably but not necessarily corresponds to a number greater than one or unity.

At saturation step 112 as shown in FIG. 1, a saturation point or level of a control voltage of input signal 110 is adjusted. In one preferred embodiment of this invention, any saturation point or level having a magnitude greater than one or unity is adjusted to ±1. As shown in FIG. 1, input signal 110 is multiplied by signal 113 at multiplier 111.

A constant polarity of adjusted signal 115 is computed at constantpolarity computation step 117 and produces constant-polarity signal 120. Constantpolarity computation step 117 rectifies a waveform associated with input signal 110. It is apparent that any other suitable operation for deriving a constant-polarity signal, such as a squaring function or an absolute value computation, can be used to achieve the constant polarity. Constant-polarity signal 120, also shown as X'(n) in FIG. 1, can be referred to as a threshold-compensated constant-polarity of input signal 110, which is also shown as X(n) in FIG. 1. In one preferred embodiment according to this invention, constant-polarity signal 120 has an instant attack time and an instant decay time.

As used throughout this specification and in the claims, the word "instant" or any related form of the word, such as when used to describe the attack time or the decay time, is intended to relate to an event theoretically occurring over zero time but practically occurring over a time period equal to approximately one PCM sample period or approximately a few PCM sample periods. Also as used throughout this specification and in the claims, the word "slow" or any related form of the word, such as when used to describe the attack time or the decay time, is intended to relate to an event occurring over a time period of a plurality of PCM samples or several PCM samples. An instant attack time of the method and system according to this invention is preferably achieved by passing constant-polarity signal 120 to filter 130 as a function of a comparison between a present constant-polarity signal 120 and previous output signal 150'.

Figure 2:
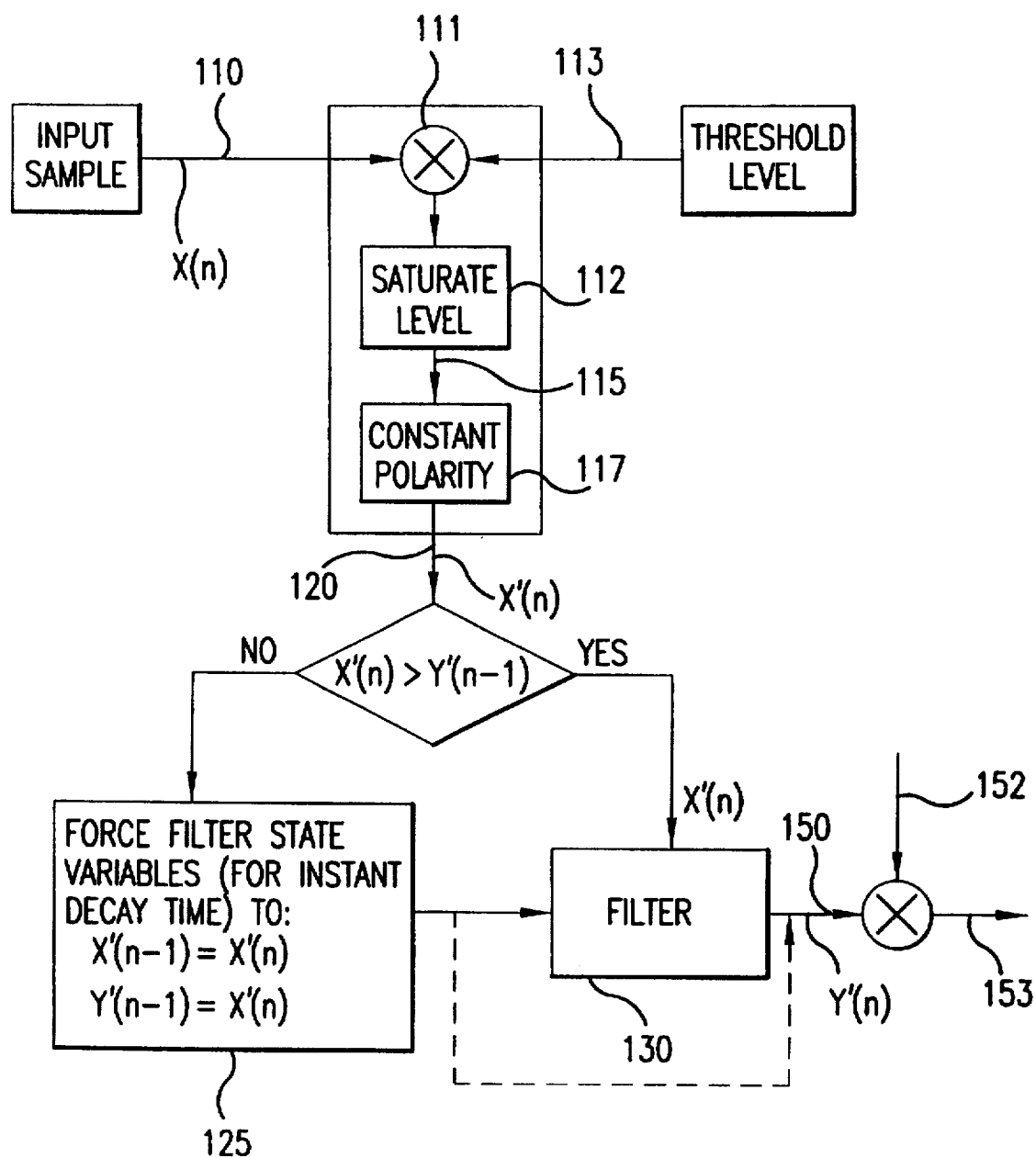
FIG. 2 is a flowchart showing a method and system for converting a digital control signal, according to another preferred embodiment of this invention.

According to one preferred embodiment, the method of this invention compares a first magnitude of at least one sample, preferably only one sample, of constant-polarity signal 120 to a second magnitude of at least one sample, preferably only one sample, of previous output signal 150'. Present output signal 150 is represented in FIGS. 1 and 2 as Y'(n) and previous output signal 150' is represented in FIGS. 1 and 2 as Y'(n-1). Initially, at time equal to zero and before previous output signal 150' exists, state variables are preset for filter 130, such as at re-initializing step 125 as shown in FIG. 1. After time equal to zero, the state variables can change over time as a function of changes of input signal 110. In one preferred embodiment of this invention, the at least one state variable is re-initialized to a present sample value of constant-polarity signal 120.

With an instant attack time as shown in FIG. 1 or an instant decay time as shown in FIG. 2, present output signal 150 will instantaneously track input signal 110. In one preferred embodiment according to this invention, present output signal 150 has an attack time less than the sample period corresponding to one PCM sample.

In one preferred embodiment of this invention, according to the flowchart of FIG. 1, if after comparing the first magnitude to the second magnitude it is determined that the first magnitude is greater than the second magnitude, then at least one state variable of filter 130 is re-initialized, such as at re-initializing step 125. In such preferred embodiment, if the first magnitude is less than the second magnitude, then constant-polarity signal 120 passes through filter 130 which emits present output signal 150.

In another preferred embodiment of this invention, as shown in the flowchart of FIG. 2, if after comparing the first magnitude to the second magnitude it is determined that the first magnitude is less than the second magnitude, then at least one state variable of filter 130 is re-initialized, such as at re-initializing step 125. In such preferred embodiment, if the first magnitude is greater than the second magnitude, then constant-polarity signal 120 passes through filter 130 which emits present output signal 150.

The dashed line in FIGS. 1 and 2 represents an alternative path, according to another preferred embodiment of the method according to this invention. It is possible for constant-polarity signal 120 to bypass filter 130, which will increase the operating speed of the method and the system according to this invention.

In one preferred embodiment according to this invention, filter 130 is a first-order filter. However, it is apparent that filter 130 can be an $n^{th}$-order filter. In other preferred embodiments according to this invention, filter 130 can be an infinite impulse response filter or a finite impulse response filter. Filter 130 is preferably a low-pass filter but can also be any other suitable filter known to those skilled in the art of digital signal processing.

As shown in FIG. 1, digital signal 152 can be multiplied with present output signal 150 to produce dynamically-controlled signal 153. In one preferred embodiment according to this invention, input signal 110 and/or digital signal 152 can be an audio signal or any other suitable signal which would be apparent to those skilled in the art of electronic signals. In one preferred embodiment of this invention, input signal 110 and digital signal 152 are derived from the same original signal source, such as but not limited to an audio signal. It is apparent that dynamically-controlled signal 153 can be used with many different systems, such as a sound system, a modem and/or the like.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

What is claimed is:

1. A method for creating a digital control signal from a digital input signal, comprising:

adjusting a sensitivity and a saturation point of a control voltage corresponding the digital input signal (110);

computing a constant polarity value of the adjusted digital signal (115) and producing a constant-polarity digital signal (120);

comparing a first magnitude of a constant-polarity digital sample of the constant-polarity digital signal (120) to a second magnitude of a digital output sample of a previous digital output signal (150'); and if the first magnitude is greater than the second magnitude re-initializing (125) at least one state variable of a filter (130) and if the first magnitude is less than the second magnitude passing the constant-polarity digital signal (120) through the filter (130) and emitting from the filter (130) a present digital output signal (150).

2. In a method according to claim 1 wherein the constant-polarity digital signal (120) bypasses the filter (130) if the at least one state variable of the filter (130) is re-initialized.

3. In a method according to claim 1 wherein the constant-polarity digital signal (120) passes through the filter (130) if the at least one state variable of the filter (130) is re-initialized.

4. In a method according to claim 1 wherein the sensitivity of the control voltage is adjusted by multiplying the digital input signal (110) by a threshold level value.

5. In a method according to claim 4 wherein the threshold level value is greater than unity.

6. In a method according to claim 4 wherein a third magnitude of the adjusted digital signal (115) is set at unity if the third magnitude is greater than unity.

7. In a method according to claim 6 wherein the constant-polarity computation (117) rectifies a waveform of the adjusted digital signal (115).

8. In a method according to claim 1 wherein the constant-polarity digital signal (120) has an instant attack time.

9. In a method according to claim 8 wherein the constant-polarity digital signal (120) has an instant decay time.

10. In a method according to claim 1 wherein the present digital output signal (150) has an attack time less than a time of a sample period of the digital input signal (110).

11. In a method according to claim 1 wherein the present digital output signal (150) has an attack time greater than a time of a sample period of the digital input signal (10).

12. In a method according to claim 1 wherein the at least one state variable is re-initialized to a present sample value of the constant-polarity digital signal (120).

13. In a method according to claim 1 wherein the filter (130) is a low-pass filter.

14. In a method according to claim 1 wherein the present digital output signal (150) and a digital signal (152) are multiplied to produce a dynamically-controlled digital signal (153).

15. In a method according to claim 14 wherein the digital signal (152) is an audio signal.

16. In a method according to claim 1 wherein the digital input signal (110) is an audio signal.

17. In a method according to claim 1 wherein the filter (130) is a first order filter.

18. In a method according to claim 1 wherein the filter (130) is an infinite impulse response filter.

19. A method for creating a digital control signal from a digital input signal, comprising:

adjusting a sensitivity and a saturation point of a control voltage corresponding to the digital input signal (110);

computing a constant polarity value of the adjusted digital signal (115) and producing a constant-polarity digital signal (120);

comparing a first magnitude of a constant-polarity digital sample of the constant-polarity digital signal (120) to a second magnitude of a digital output sample of a previous digital output signal (150'); and if the first magnitude is less than the second magnitude re-initializing (125) at least one state variable of a filter (130) and if the first magnitude is greater than the second magnitude passing the constant-polarity digital signal (120) through the filter (130) and emitting from the filter (130) a present digital output signal (150).

20. In a method according to claim 19 wherein the constant polarity digital signal (120) bypasses the filter (130) if the at least one state variable of the filter (130) is re-initialized.

21. In a method according to claim 19 wherein the constant-polarity digital signal (120) passes through the filter (130) if the at least one state variable of the filter (130) is re-initialized.

22. In a method according to claim 19 wherein the sensitivity of the control voltage is adjusted by multiplying the digital input signal (110) by a threshold level value.

23. In a method according to claim 22 wherein the threshold level value is greater than unity.

24. In a method according to claim 22 wherein a third magnitude of the adjusted digital signal (115) is set at unity if the third magnitude is greater than unity.

25. In a method according to claim 24 wherein the constant-polarity computation (117) rectifies a waveform of the adjusted digital signal (115).

26. In a method according to claim 19 wherein the constant-polarity digital signal (120) has an instant attack time.

27. In a method according to claim 26 wherein the constant-polarity digital signal (120) has an instant decay time.

28. In a method according to claim 19 wherein the present digital output signal (150) has an attack time less than a time of a sample period of the digital input signal (110).

29. In a method according to claim 19 wherein the present digital output signal (150) has an attack time greater than a time of a sample period of the digital input signal (110).

30. In a method according to claim 19 wherein the at least one state variable is re-initialized to a present sample value of the constant-polarity digital signal (120).

31. In a method according to claim 19 wherein the filter (130) is a low-pass filter.

32. In a method according to claim 19 wherein the present digital output signal (150) and a digital signal (152) are multiplied to produce a dynamically-controlled digital signal (153).

33. In a method according to claim 32 wherein the digital signal (152) is an audio signal.

34. In a method according to claim 19 wherein the digital input signal (110) is an audio signal.

35. In a method according to claim 19 wherein the filter (130) is a first order filter.

36. In a method according to claim 19 wherein the filter (130) is an infinite impulse response filter.

* * * * *